US008334342B2

(12) United States Patent  
Althöfer et al.

(10) Patent No.: US 8,334,342 B2  
(45) Date of Patent: Dec. 18, 2012

(54) GLYOXAL AND METHYLGLYOXAL AS ADDITIVE FOR POLYMER BLENDS

(75) Inventors: Henning Althöfer, Wachenheim (DE); Robert Loos, Mannheim (DE)

(73) Assignee: BASF SE, Ludwigshafen (DE)

( * ) Notice: Subject to any disclaimer, the term of this patent is extended or adjusted under 35 U.S.C. 154(b) by 68 days.

(21) Appl. No.: 12/999,952

(22) PCT Filed: Jun. 17, 2009

(86) PCT No.: PCT/EP2009/057504  
§ 371 (c)(1),  
(2), (4) Date: Dec. 17, 2010

(87) PCT Pub. No.: WO2009/153275  
PCT Pub. Date: Dec. 23, 2009

(65) Prior Publication Data  
US 2011/0124807 A1 May 26, 2011

(30) Foreign Application Priority Data  
Jun. 18, 2008 (EP) ..................... 08158453

(51) Int. Cl.  
C08G 63/60 (2006.01)  
C08B 31/00 (2006.01)  
C07C 47/00 (2006.01)  
C07C 49/00 (2006.01)

(52) U.S. Cl. ............... 524/605; 525/54.24; 568/412; 568/494

(58) Field of Classification Search .......... 524/605; 525/54.24; 568/494, 412  
See application file for complete search history.

(56) References Cited

U.S. PATENT DOCUMENTS

| 5,322,866 A | 6/1994 | Mayer et al. |
| 5,346,936 A | 9/1994 | Buehler et al. |
| 5,374,304 A | 12/1994 | Frische et al. |
| 5,817,721 A | 10/1998 | Warzelhan et al. |
| 5,863,991 A | 1/1999 | Warzelhan et al. |
| 5,880,220 A | 3/1999 | Warzelhan et al. |
| 5,889,135 A | 3/1999 | Warzelhan et al. |
| 6,018,004 A | 1/2000 | Warzelhan et al. |
| 6,046,248 A | 4/2000 | Warzelhan et al. |
| 6,096,809 A | 8/2000 | Lorcks et al. |
| 6,111,058 A | 8/2000 | Warzelhan et al. |
| 6,114,042 A | 9/2000 | Warzelhan et al. |
| 6,120,895 A | 9/2000 | Kowitz et al. |
| 6,201,034 B1 | 3/2001 | Warzelhan et al. |
| 6,258,924 B1 | 7/2001 | Warzelhan et al. |
| 6,303,677 B1 | 10/2001 | Warzelhan et al. |
| 6,353,084 B1 | 3/2002 | Warzelhan et al. |
| 6,727,298 B2 | 4/2004 | Witt et al. |
| 2004/0033242 A1 | 2/2004 | McDonald et al. |

FOREIGN PATENT DOCUMENTS

| EP | 1263859 A1 | 12/2002 |
| JP | 52-024254 | 2/1977 |
| WO | WO-92/09654 A2 | 6/1992 |
| WO | WO 92/19680 | * 11/1992 |
| WO | WO-92/19680 A1 | 11/1992 |
| WO | WO-94/01468 A1 | 1/1994 |
| WO | WO-96/15173 A1 | 5/1996 |
| WO | WO-96/15174 A1 | 5/1996 |
| WO | WO-96/15175 A1 | 5/1996 |
| WO | WO-96/15176 A1 | 5/1996 |
| WO | WO-96/19348 A1 | 6/1996 |
| WO | WO-96/21689 A2 | 7/1996 |
| WO | WO-96/21690 A1 | 7/1996 |
| WO | WO-96/21691 A1 | 7/1996 |
| WO | WO-96/21692 A1 | 7/1996 |
| WO | WO-96/25446 A1 | 8/1996 |
| WO | WO-96/25448 A1 | 8/1996 |
| WO | WO-98/12242 A1 | 3/1998 |

OTHER PUBLICATIONS

R. F. Storey et al., Polymer 35 (4), 830-838, 1994.  
P. Bruin et al., Makromolekulare chemie 9, 589-594, 1988.

* cited by examiner

Primary Examiner — William Cheung  
(74) Attorney, Agent, or Firm — Connolly Bove Lodge & Hutz LLP

(57) ABSTRACT

The present invention relates to a polymer blend, comprising  
(a) at least one hydrophobic polymer, as component A,  
(b) at least one hydrophilic polymer, as component B, and  
(c) at least one structural unit that crosslinks component A and/or B and derives from at least one compound selected from the group consisting of aldehydes, dialdehydes, diketones, aldehyde ketones, derivatives of the abovementioned compounds, and mixtures thereof, as component C, and to processes for the production thereof and to the use thereof.

11 Claims, No Drawings

GLYOXAL AND METHYLGLYOXAL AS ADDITIVE FOR POLYMER BLENDS

CROSS-REFERENCE TO RELATED APPLICATIONS

This application is a national stage application (under 35 U.S.C. §371) of PCT/EP2009/057504, filed Jun. 17, 2009, which claims benefit of European application 08158453.4, filed Jun. 18, 2008, the contents of each of which are incorporated herein by reference in their entireties.

FIELD OF THE INVENTION

The present invention relates to a polymer blend, comprising at least one hydrophobic polymer, as component A, at least one hydrophilic polymer, as component B, and at least one structural unit that crosslinks component A and/or B and derives from at least one compound selected from the group consisting of aldehydes, dialdehydes, diketones, aldehyde ketones, derivatives of the abovementioned compounds, and mixtures thereof, as component C, to processes for the production of said polymer blends, to components, foils, or films comprising this polymer blend, to the use of this polymer blend for the production of components, of foils, or of films, and also to the use of at least one compound selected from the group consisting of aldehydes, dialdehydes, diketones, aldehyde ketones, derivatives of the abovementioned compounds, and mixtures thereof, for the production of polymer blends comprising at least one hydrophobic polymer and at least one hydrophilic polymer.

The present invention particularly relates to biodegradable/biocompatible polymer blends, and also to a process for their production. Biodegradable and biocompatible polymers and polymer blends are known from the prior art.

BACKGROUND

U.S. Pat. No. 5,322,866 discloses a process for the production of biodegradable starch-based products, where untreated starch is mixed with biodegradable copolymers, such as polyvinyl alcohol or ethylene-vinyl alcohol, and with a plasticizer, and also with a moistening agent. Glycerol is a suitable plasticizer. Other suitable additives are talc or stearates, such as calcium stearate or zinc stearate. The biodegradable polymer blends according to U.S. Pat. No. 5,322,866 are produced via coextrusion of the molten components.

U.S. Pat. No. 6,096,809 discloses biodegradable polymer mixtures comprising at least one starch biopolymer, one plasticizer, and one polymer selected from aromatic polyesters, polyester copolymers having not only aliphatic but also aromatic blocks, polyesteramides, polyglycol, polyesterurethanes, and mixtures thereof. According to U.S. Pat. No. 6,096,809, the mixture can comprise plasticizers, stabilizers, antiflaming agents and, if appropriate, further biodegradable polymers, alongside the abovementioned polymers. According to said document it is possible to add crosslinking compounds, such as alkylketene dimers, in order to reduce the level of properties of the hydrophilic polymer.

U.S. Pat. No. 5,346,936 discloses a biodegradable single-phase starch/polymer mixture comprising chemically modified starch, emulsifying agent, plasticizer or destructuring compounds, and at least one linear polymer. The plasticizers that can be used are organic compounds which have at least one hydroxyl group, examples being glycerol, sorbitol, mannitol, D-glucose, ethylene glycol, polyethylene glycol, propylene glycol, and mixtures thereof. Suitable emulsifying agents are metal stearates, glycerol monostearates, polyoxyethylene sorbitan monolaurates, polyoxyethylene monopalmitates, polyoxyethylene stearates, and mixtures thereof. Other suitable additives are optical brighteners, stabilizers, antioxidants, flameproofing agents, dyes, fillers, and additives which increase processability during the production process.

U.S. Pat. No. 5,374,304 discloses biodegradable, clear, transparent, and flexible plastics based on amylose, which also comprise a plasticizer. Compounds suitable as plasticizer are glycerol, diethylene glycol, triethylene glycol, sorbitol, polyvinyl alcohol, citric acid adducts, and mixtures thereof.

EP 1 263 859 A1 discloses foils and coatings which comprise a mixture composed of a polymer selected from aliphatic polyesters, such as polylactic acid or polycaprolactone, starch, and beeswax or montan ester wax. The mixture according to EP 1 263 859 A1 can moreover comprise additives selected from fatty acid amides, talc, neutralizing agents, stabilizers, or dyes.

R. F. Storey et al., Polymer 35 (4), 830 to 838, 1994, and P. Bruin et al., Makromolekulare Chemie 9, 589-594, 1998, disclose degradable polyurethanes based on D,L-lactic acid, glucose, $\epsilon$-caprolactone, and trimethylene carbonate homopolyesters, crosslinked by toluene 2,6-diisocyanate (TDI).

Polymer blends comprising starch have undesired high water absorption capability, which makes it more difficult to use them to produce foils, for example for the packaging sector. The mechanical properties of polymer mixtures comprising starch are moreover unsatisfactory. Addition of, for example, polyesters to these mixtures with the aim of increasing mechanical stability has an adverse effect on the costs of a corresponding biodegradable polymer mixture. The use of diisocyanates for the crosslinking of starch-polymer blends leads to products which have increased toxicity by virtue of the presence of diisocyanates, and these cannot therefore be used in the food-and-drink sector. The crosslinking brought about by diisocyanates is moreover difficult to reverse, and the biodegradability of these products is therefore inadequate.

BRIEF SUMMARY

It is therefore an object of the present invention, in the light of the abovementioned prior art, to provide polymer blends comprising hydrophilic and hydrophobic polymers, where these are biodegradable, and have adequate mechanical properties for use as, for example, packaging or carrier bags, and have low toxicity. A further intention is to provide a process which can produce these polymer blends and which can be carried out easily and inexpensively using apparatuses currently available.

These objects are achieved via a polymer blend, comprising (a) at least one hydrophobic polymer, as component A,
(b) at least one hydrophilic polymer, as component B, and
(c) at least one structural unit that crosslinks component A and/or B and derives from at least one compound selected from the group consisting of aldehydes, dialdehydes, diketones, aldehyde ketones, derivatives of the abovementioned compounds, and mixtures thereof, as component C.

The objects are further achieved via a process for the production of polymer blends according to the invention, comprising the steps of (A) mixing of at least one hydrophobic polymer as component A with at least one hydrophilic polymer as component B, in order to obtain a polymer blend, and (B) mixing of the polymer blend obtained in step (A) with a compound selected from the group consisting of aldehydes, dialdehydes, diketones, aldehyde ketones, derivatives of the abovementioned compounds, and mixtures thereof, as component D, and reaction in order to obtain the polymer blend according to the invention.

The objects are further achieved via a process for the production of polymer blends according to the invention, comprising the steps of (C) mixing of at least one hydrophilic polymer as component B with a compound selected from the group consisting of aldehydes, dialdehydes, diketones, aldehyde ketones, derivatives of the abovementioned compounds, and mixtures thereof, and reaction in order to obtain a modified polymer, and (D) mixing of the modified polymer obtained in step (C) with at least one hydrophobic polymer A, in order to obtain a polymer blend.

The objects are further achieved via components, foils, or films comprising the abovementioned polymer blend, and via the use of said polymer blend for the production of components, of foils, or of films, and the use of at least one compound selected from the group consisting of aldehydes, dialdehydes, diketones, aldehyde ketones, derivatives of the abovementioned compounds, and mixtures thereof, for the crosslinking of polymer blends comprising at least one hydrophobic polymer, as component A, and at least one hydrophilic polymer, as component B, where component A and/or B is/are crosslinked.

DETAILED DESCRIPTION OF THE PREFERRED EMBODIMENTS

The polymer blend of the invention comprises, as component A, at least one hydrophobic polymer.

For the purposes of the present invention, "hydrophobic" and "hydrophilic" mean that the behavior of the various polymers with respect to one another is relatively hydrophobic and, respectively, hydrophilic, i.e. that their level of hydrophilic properties is different.

The hydrophobic polymer used in the polymer blend according to the present invention can comprise any hydrophobic polymer known to the person skilled in the art. It is preferable that the component A used comprises thermoplastic, hydrophobic polymers.

It is particularly preferable that the at least one hydrophobic polymer (component A) has been selected from the group consisting of polyamides, polyesters, polyurethanes, polyolefins, copolymers comprising structural units composed of the abovementioned polymers, and mixtures thereof. In one very particularly preferred embodiment, the at least one hydrophobic polymer (component A) is at least one biodegradable, preferably thermoplastic, polyester.

Polyamides and processes for their production are known to the person skilled in the art. Examples of suitable polyamides are homo- and/or copolyamides composed of omega-aminocaproic acid, omega-aminoenanthic acid, omega-aminocaprylic acid, omega-aminopelargonic acid, omega-aminocapric acid, omega-aminoundecylic acid, omega-aminolauric acid, and/or caprolactam, laurolactam, and/or composed of dimethylenediamine, trimethylenediamine, tetramethylenediamine, pentamethylene-diamine, hexamethylenediamine, polyetherdiamine, and oxalic acid, malonic acid, succinic acid, glutaric acid, adipic acid, pimelic acid, suberic acid, azelaic acid, sebacic acid, nonanedicarboxylic acid, decanedicarboxylic acid, undecanedioic acid, dodecanedioic acid, dimerized fatty acid.

Particular preference is given to homo- and copolyamides composed of caprolactam, laurolactam, omega-aminolauric acid, omega-aminocaproic acid, hexamethylene-diamine, polyetherdiamine, adipic acid, dimerized fatty acid, or a mixture thereof.

Homo- or copolyamides can be produced via polycondensation of diamines and dicarboxylic acids or aminocarboxylic acids, if appropriate with acid catalysis, and/or simultaneous removal of the resultant water of reaction, by the process known to the person skilled in the art.

Polyesters and processes for their production are known to the person skilled in the art. From the polyesters class of materials, preference is given to homopolyesters and/or copolyesters composed of hydroxyalkanoic acids or of aliphatic dicarboxylic acids, or of aromatic dicarboxylic acids, e.g. 2-hydroxypropionic acid (lactic acid), 3-hydroxybutyric acid (polyhydroxybutyrate), omega-hydroxyacetic acid, omega-hydroxypropionic acid, omega-hydroxybutyric acid, omega-hydroxyvaleric acid, omega-hydroxycaproic acid, omega-hydroxyenanthic acid, omega-hydroxycaprylic acid, omega-hydroxypelargonic acid, omega-hydroxycapric acid, omega-hydroxyundecylic acid, omega-hydroxylauric acid, and/or caprolactone, lactone 7, lactone 8, lactone 9, lactone 10, lactone 11, laurolactone, oxalic acid, malonic acid, succinic acid, glutaric acid, adipic acid, pimelic acid, suberic acid, azelaic acid, sebacic acid, nonanedicarboxylic acid, decanedicarboxylic acid, undecanedioic acid, dodecanedioic acid, terephthalic acid, isophthalic acid, and/or anhydrides thereof, and/or chlorides thereof, and/or esters thereof with an aliphatic diol or diol mixture having from 2 to 18 carbon atoms, e.g. ethyleneglycol, 1,3-propanediol, 1,2-propanediol, 1,4-butanediol, 1,5-pentanediol, 1,6-hexanediol. Particular preference is given to biodegradable homo- or copolyesters selected from the group consisting of polylactic acid, polycaprolactone, polyhydroxyalkanoates, polyesters composed of aliphatic dicarboxylic acids and of aliphatic diols, and semiaromatic polyesters. Preferred components are polylactide (PLA) and polyhydroxyalkanoates, and among these in particular polyhydroxybutyrate (PHB), polyhydroxybutyrate-co-valerate (PHBV), and polyhydroxybutyrate-co-4-hydroxybutyrate (P3HB-co-4HB). Particular products included are those such as NatureWorks® (polylactic acid from Natureworks), Biocycle® (polyhydroxybutyrate from PHB Ind.); Enmat® (polyhydroxybutyrate-co-valerate from Tianan), Mirel® (polyhydroxybutyrate-co-4-hydroxybutyrate from Telles/Metabolix/ADM).

According to the invention, the term biodegradable semiaromatic polyesters is also intended to include polyester derivatives, such as polyetheresters, polyesteramides, or polyetheresteramides. Among the suitable biodegradable semiaromatic polyesters are linear non-chain-extended polyesters (WO 92/09654). Preference is given to chain-extended and/or branched semiaromatic polyesters. The latter are known from the specifications mentioned in the introduction: WO 96/15173 to 15176, 21689 to 21692, 25446, 25448, or WO 98/12242, and these are expressly incorporated herein by way of reference. It is also possible to use a mixture of various semiaromatic polyesters. Semiaromatic polyesters in particular include products such as Ecoflex® (BASF Aktiengesellschaft) and Eastar® Bio (Novamont).

The preferred semiaromatic polyesters are characterized by a molar mass ($M_n$) in the range from 1000 to 100 000 g/mol, in particular in the range from 9000 to 75 000 g/mol, preferably in the range from 10 000 to 50 000 g/mol, and by a melting point in the range from 60 to 170° C., preferably in the range from 80 to 150° C.

A material or mixture of materials complies with the definition of "biodegradable" if said material or mixture of materials has a percentage degree of biodegradation of at least 60% in at least one of the three methods defined in DIN V 54900-2 (draft standard, as at September 1998).

Biodegradation generally leads to decomposition of the polyesters or polyester mixtures in an appropriate and demonstrable period of time. The degradation can take place by an enzymatic, hydrolytic, or oxidative route, and/or via exposure to electromagnetic radiation, such as UV radiation, and can mostly be brought about predominantly via exposure to microorganisms, such as bacteria, yeasts, fungi, and algae. Biodegradability can be quantified by way of example by mixing polyesters with compost and storing them for a particular period. By way of example, according to DIN EN 13432 or DIN V 54900-2, method 3, $CO_2$-free air is passed through ripened compost during the composting process, and the compost is subjected to a defined temperature profile. The biodegradability here is defined as a percentage degree of biodegradation by way of the ratio of the net amount of $CO_2$ released from the specimen (after subtraction of the amount of $CO_2$ released by the compost without specimen) to the maximum amount of $CO_2$ that can be released from a specimen (calculated from the carbon content of the specimen). Biodegradable polyesters or biodegradable polyester mixtures generally exhibit marked signs of degradation after just a few days of composting, examples being fungal growth, cracking and perforation.

Other methods for determining biodegradability are described by way of example in ASTM D 5338 and ASTM D 6400.

Homo- or copolyesters can be produced by processes known to the person skilled in the art, via polycondensation of diols and dicarboxylic acids or hydroxycarboxylic acids, if appropriate with acid catalysis and/or simultaneous removal of the water of reaction produced.

Polyurethanes suitable according to the invention, and processes for their production, are known to the person skilled in the art.

Polyolefins suitable according to the invention, and processes for their production, are known to the person skilled in the art. Polyolefins suitable according to the invention are homo- or copolyolefins, for example those composed of mono- or polyunsaturated aliphatic or aromatic compounds, examples being ethene, propene, butene, butadiene, pentenes, hexenes, styrene, substituted styrene, such as alpha-methylstyrene, or a mixture thereof. Preferred polyolefins are those selected from the group consisting of polyethylene, polypropylene, polybutylene, polystyrene, and copolymers comprising structural units of the abovementioned polyolefins.

Homo- and copolyolefins can be obtained via free-radical, anionic, or cationic polymerization, by the processes known to the person skilled in the art.

The polymer blend of the invention comprises, as component B, at least one hydrophilic polymer. In one preferred embodiment, the at least one hydrophilic polymer (component B) is a homo- or copolymer comprising hydroxy and/or amide groups. It is particularly preferable that the at least one hydrophilic polymer (component B) has been selected from the group consisting of starch, cellulose, polyvinyl alcohol, proteins, poly(meth)acrylamides, polysaccharides, and mixtures thereof.

According to the invention, the starch used can comprise polymeric compounds of this type which have different origin or constitution. According to the invention, the term "starch" comprises, by way of example, polysaccharides of natural, vegetable origin, preferably composed of amylose and/or of amylopectin. Starch that can be used according to the invention can by way of example be obtained from various plants, examples being potatoes, rice, tapioca, maize, peas, or cereals, such as wheat, oats, or rye. Suitable processes for this are known to the person skilled in the art. According to the invention, it is preferable to use starch produced from potatoes, from maize, from wheat, and/or from rice. Mixtures of starches of different origin can likewise be used. The starch can be used in native form, i.e. in hydrated form, or in the form of dried starch.

It is moreover also possible to use, as component B, thermoplastically processable starches, examples being starches which have side chains, for example linear or branched $C_1$-$C_{12}$-alkyl and/or aryl chains, linked to the free hydroxy groups of the starch by way of ether groups or by way of ester groups.

The polymer blend of the invention comprises, as component C, at least one structural unit that crosslinks component A and/or B and derives from at least one compound selected from the group consisting of aldehydes, dialdehydes, diketones, aldehyde ketones, derivatives of the abovementioned compounds, and mixtures thereof.

Aldehydes can be used as component C. Suitable examples are those selected from the group consisting of formaldehyde, ethanal, propanal, butanals, pentanals, and mixtures thereof.

The crosslinking structural units present as component C in the polymer blend of the invention preferably derive from compounds which have at least two aldehyde groups, at least two keto groups, or at least one aldehyde group and at least one keto group.

In the polymer blend of the invention, the crosslinking structural units C generally crosslink component A within itself, component B within itself, and/or component A and component B to one another. It is preferable that component B is crosslinked within itself.

The crosslinking structural units preferably result from the reaction of the aldehyde groups and/or keto groups mentioned with the free hydroxy or amide groups of the hydrophilic polymers present as component B. Reaction of the aldehyde groups and/or keto groups with the hydroxyl groups of the at least one hydrophilic polymer (component B) results in the formation of acetal groups. Since the compounds underlying the crosslinking structural units preferably have at least two functional groups, the result of reaction of said at least two functional groups with the hydrophilic polymer is the crosslinking of the at least one hydrophilic polymer (component B). The crosslinking structural units (component C) therefore correspond to their underlying compounds, where the aldehyde groups or keto groups preferably present have been converted to acetal groups or to aminoacetal groups. The degree of crosslinking can be adjusted via the amount of compounds underlying the crosslinking structural units.

In one preferred embodiment, component C of the polymer blend of the invention derives from dialdehydes, diketones, aldehyde ketones of the general formula (I), or a mixture thereof

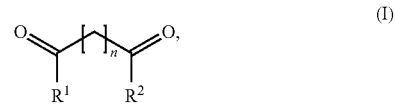
(I)

in which

R¹ and R², independently of one another, are hydrogen, $C_1$-$C_8$-alkyl, $C_2$-$C_8$-alkenyl, $C_2$-$C_8$-alkynyl, $C_6$-$C_{22}$-aryl, $C_6$-$C_{22}$-heteroaryl, $C_6$-$C_{22}$-alkylaryl, or $C_6$-$C_{22}$-alkylheteroaryl, and n is from 0 to 12.

In one preferred embodiment, R¹ and R², independently of one another, are hydrogen or $C_1$-$C_8$-alkyl, particularly preferably being selected, independently of one another, from hydrogen, methyl, ethyl, propyl, or butyl, and particularly preferably, independently of one another, from hydrogen or methyl. In another preferred embodiment, n is 0, 1, 2, 3, 4, 5, or 6, particularly preferably 0, 1, 2, or 3, very particularly preferably 0 or 3.

In one very particularly preferred embodiment, component C derives from glyoxal (II) (R¹ and R² being hydrogen and n being 0), methylglyoxal (III) (R¹ being methyl and R² being hydrogen, and n being 0), glutaraldehyde (IV) (R¹ and R² being hydrogen and n being 3), or from a mixture thereof.

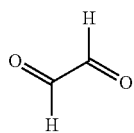

(II)

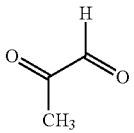

(III)

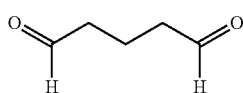

(IV)

According to the invention, it is also possible that the crosslinking structural unit present as component C derives from derivatives of the abovementioned compounds, in particular of the dialdehydes, diketones, and/or aldehyde ketones. Examples of suitable derivatives are acetals, in particular full acetals and hemiacetals, these being converted via reaction of the corresponding aldehyde groups or keto groups in the compounds with a mono- or polyhydric alcohol, where polyhydric alcohols form cyclic hemiacetals or cyclic full acetals.

Examples of suitable monohydric alcohols are aliphatic alcohols having from one to ten carbon atoms, e.g. methanol, ethanol, propanol, isopropanol, and/or n-propanol, butanol, n-butanol, isobutanol, and/or tert-butanol, pentanol, hexanol, and mixtures thereof.

Examples of suitable polyhydric alcohols are those selected from the group consisting of compounds of the general formula (V)

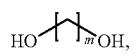

(V)

in which m is from 2 to 8, preferably 2 or 3. Particularly preferred dihydric alcohols are glycol (1,2-ethanediol), 1,3-propanediol, and mixtures thereof.

Particularly preferred dialdehydes, aldehyde ketones, and acetals of dialdehydes, of diketones, and of aldehyde ketones, from which the at least one crosslinking structural unit (component C) derives in the polymer blend of the invention are those selected from the group shown below

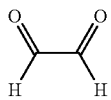

(II)

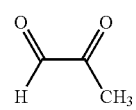

(III)

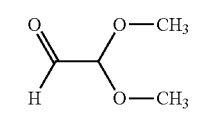

(IIa)

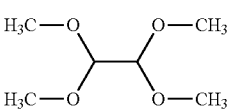

(IIb)

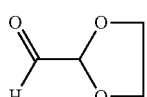

(IIc)

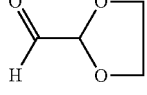

(IId)

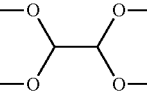

(IIe)

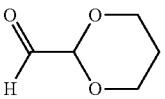

(IIf)

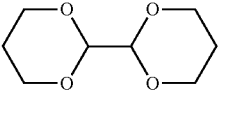

(IIIa)

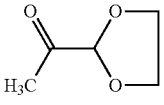

(IIIb)

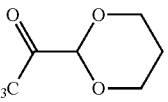

Other compounds that can be used according to the invention and derive from dialdehydes, from diketones, or from aldehyde ketones are adducts of urea or of dialkylurea, for example dimethylurea, onto said compounds, examples being urea adducts of glyoxal or of methylglyoxal, or adducts of urea derivatives, such as dimethylurea, with glyoxal or methylglyoxal, using one or two equivalents of urea or dimethylurea, examples being compounds of the following formulae (VIa) to (VIk) and (VIm).

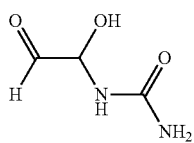 (VIa)

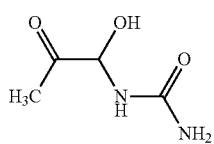 (VIb)

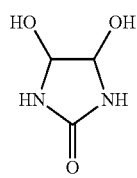 (VIc)

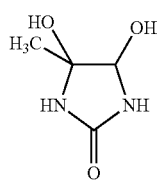 (VId)

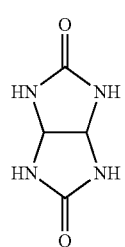 (VIe)

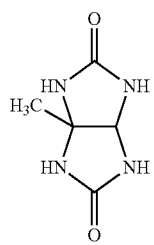 (VIf)

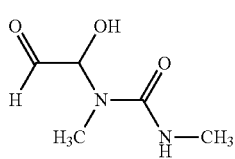 (VIg)

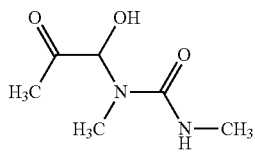 (VIh)

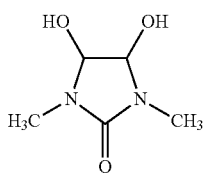 (VIi)

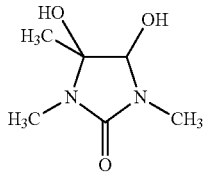 (VIj)

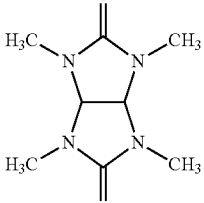 (VIk)

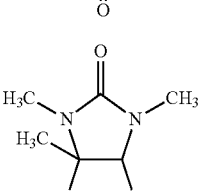 (VIm)

Examples of other suitable derivatives are glyoxal resins or methylglyoxal resins, e.g. dimethylol-1,3-dihydroxy-4,5-imidazolidinone (DMDHEU).

According to the invention, a preferred polymer blend is therefore one where component C derives from urea derivatives or dialkylurea derivatives of dialdehydes, diketones, aldehyde ketones, or a mixture thereof, or glyoxal resins or methylglyoxal resins.

In one very particularly preferred embodiment, component C derives from glyoxal, methylglyoxal, or a mixture thereof.

In another preferred embodiment, the polymer blend of the invention comprises at least one plasticizer. According to the invention, any plasticizer known to the person skilled in the art as plasticizer for polymer blends based on starch can be used, examples being organic compounds having at least one hydroxy group, preferably polyol, particularly preferably glycerol, sorbitol, mannitol, D-glycose, ethylene glycol, polyethylene glycol, propylene glycol, or a mixture of these.

The polymer blend of the invention generally comprises from 10 to 90% by weight, preferably from 40 to 80% by weight, particularly preferably from 55 to 70% by weight, based in each case on the polymer blend, of at least one hydrophobic polymer, as component A.

The polymer blend of the invention generally comprises from 10 to 90% by weight, preferably from 20 to 50% by weight, particularly preferably from 25 to 45% by weight, in each case based on the polymer blend, of at least one hydrophilic polymer, as component B.

The polymer blend of the invention generally comprises from 0.01 to 30% by weight, preferably from 0.01 to 10% by weight, particularly preferably from 0.01 to 4% by weight, in each case based on the polymer blend, of at least one crosslinking structural unit, as component C.

If at least one plasticizer is present, its amount present, in each case based on the polymer blend, is generally from 0.5 to 40% by weight, preferably from 1 to 30% by weight.

According to the invention, it is possible that further additives are present, examples being optical brighteners, stabilizers, antioxidants, flame retardants, dyes, fillers, processing aids, and mixtures thereof. The amount present of these additives, based on the polymer blend, is from 0 to 50% by weight, and, if they are present, from 1 to 30% by weight.

The entirety of the components present in the polymer blend of the invention is in all cases 100% by weight.

The present invention also provides a process (I) for the production of the polymer blends of the invention, in particular of the abovementioned polymer blends of the invention, comprising the steps of (A) mixing of at least one hydrophobic polymer as component A with at least one hydrophilic polymer as component B, in order to obtain a polymer blend, and (B) mixing of the polymer blend obtained in step (A) with a compound selected from the group consisting of aldehydes, dialdehydes, diketones, aldehyde ketones, derivatives of the abovementioned compounds, and mixtures thereof, as component D, and reaction in order to obtain a polymer blend.

Step (A) of the process of the invention comprises the mixing of at least one hydrophobic polymer as component A with at least one hydrophilic polymer as component B, in order to obtain a polymer blend.

In one preferred embodiment, the at least one hydrophobic polymer used as component A comprises the abovementioned hydrophobic polymers, in particular those selected from the group consisting of polyamides, polyesters, polyurethanes, polyolefins, copolymers comprising structural units composed of the abovementioned polymers, and mixtures thereof.

The at least one hydrophilic polymer used as component B in the process of the invention preferably comprises the abovementioned polymers, in particular those selected from the group consisting of starch, cellulose, polyvinyl alcohol, proteins, poly(meth)acrylamides, polysaccharides, and mixtures thereof.

The statements made in relation to the polymer blend of the invention are applicable in relation to the properties and, respectively, the preferred embodiments of components A and B.

Step (A) of the process of the invention can be carried out at any temperature at which the components to be mixed can be melted and mixed with one another, an example being from 20 to 250° C. The temperature depends on the melting points of the respective polymers.

The mixing in step (A) of the process of the invention can take place in any apparatus known to the person skilled in the art, for example in an extruder or in a kneader, or in a stirred tank.

Step (A) of the process of the invention generally uses from 10 to 90% by weight, preferably from 40 to 80% by weight, particularly preferably from 55 to 70% by weight, of at least one hydrophobic polymer as component A, in each case based on the mixture composed of components A and B.

Step (A) of the process of the invention generally uses from 10 to 90% by weight, preferably from 20 to 60% by weight, particularly preferably from 25 to 50% by weight, of at least one hydrophilic polymer as component B, in each case based on the mixture composed of components A and B.

If appropriate, the appropriate amounts of the abovementioned additives can be added in step (A) of the process of the invention. However, this addition can also or additionally take place in step (B).

Step (B) of the process of the invention comprises the mixing of the polymer blend obtained in step (A) with a compound selected from the group consisting of aldehydes, dialdehydes, diketones, aldehyde ketones, derivatives of the abovementioned compounds, and mixtures thereof, as component D, and reaction in order to obtain a polymer blend.

In one particularly preferred embodiment, step (B) of the process of the invention uses those dialdehydes, diketones, aldehyde ketones, derivatives of the compounds mentioned, and mixtures thereof that were mentioned above in relation to the polymer blend. It is particularly preferable that glyoxal, methylglyoxal, acetals of the following formulae (II), (IIa) to (IIf), (III), (IIIa), and (IIIb)

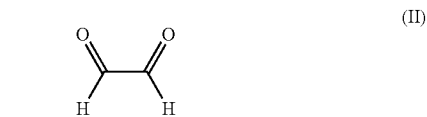
(II)

(III)

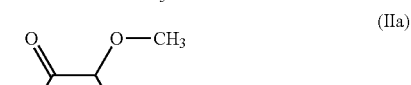
(IIa)

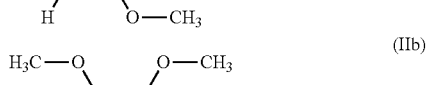
(IIb)

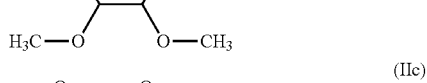
(IIc)

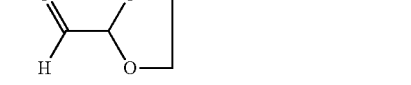
(IId)

(IIe)

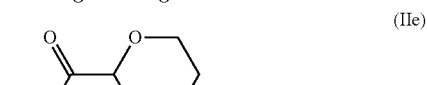
(IIf)

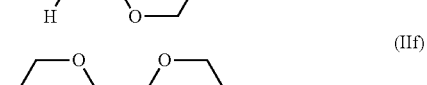
(IIIa)

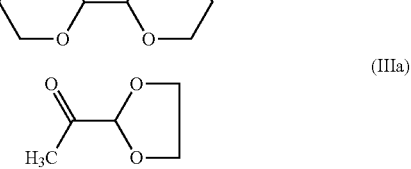
(IIIb)

or the abovementioned urea adducts or dialkylurea adducts, in particular dimethylurea adducts, of glyoxal or of methylglyoxal are added as component D in step (B).

Step (B) of the process of the invention generally uses from 0.01 to 30% by weight, preferably from 0.01 to 10% by weight, particularly preferably from 0.01 to 4% by weight, in each case based on the mixture obtained in step (B), of component D.

Component D can be added in bulk or in the form of solution in step (B) of the process of the invention. Suitable solvents are known to the person skilled in the art, an example being water.

It is preferable to use water as solvent. The concentration of the aqueous solution preferably used of component D, in particular of glyoxal and/or methylglyoxal, is generally from 1 to 70% by weight, preferably from 10 to 60% by weight, particularly preferably from 30 to 50% by weight.

In one preferred embodiment, the mixing in step (B) is carried out in an extruder. The temperature in step (B) of the process of the invention is generally set in such a way that the polymer blend from step (A) and component D are mutually miscible. It is preferable that step (B) of the process of the invention is carried out at a temperature of from 100 to 220° C., particularly from 130 to 180° C., and very particularly from 140 to 170° C.

According to the invention, it is possible that the polymer blend from step (A) and component D are added simultaneously to the apparatus used for the mixing process, such as an extruder. However, it is preferable that the polymer blend from step (A) is first melted in an extruder, in order to obtain maximum homogeneity of mixing of components A and B. Component D is then added, preferably in the form of aqueous solution, to the molten polymer blend.

The reaction taking place in step (B) of the process of the invention generally consists in the reaction of the functional groups, i.e. the aldehyde groups and/or keto groups, of component D with the functional groups present in components A and/or B, in particular with the hydroxy functions present in component B, forming acetal groups, in such a way as to give crosslinking of component A and/or B, in particular of component B.

Step (B) is carried out for a period sufficient to ensure maximum mixing of the individual components.

Following step (B) of the process of the invention, any of the process steps known to the person skilled in the art for the processing and/or finishing of the resultant polymer blend can then be carried out, examples being shaping, for example drawing to give a foil or to give a film.

The present invention also provides a process (II) for the production of the polymer blends of the invention, comprising the steps of
(C) mixing of at least one hydrophilic polymer as component B with a compound selected from the group consisting of aldehydes, dialdehydes, diketones, aldehyde ketones, derivatives of the abovementioned compounds, and mixtures thereof, as component D, and reaction in order to obtain a modified polymer, and
(D) mixing of the modified polymer obtained in step (C) with at least one hydrophobic polymer A, in order to obtain a polymer blend.

Step (C) of the process of the invention comprises the mixing of at least one hydrophilic polymer as component B with a compound selected from the group consisting of aldehydes, dialdehydes, diketones, aldehyde ketones, derivatives of the abovementioned compounds, and mixtures thereof, and reaction in order to obtain a modified polymer.

It is preferable that step (C) of the process (II) of the invention carries out precrosslinking in which the at least one hydrophilic polymer (component B) is reacted with a compound selected from the group consisting of aldehydes, dialdehydes, diketones, aldehyde ketones, derivatives of the abovementioned compounds, and mixtures thereof, in order to obtain a modified polymer which is preferably a precrosslinked polymer. "Precrosslinked" means for the purposes of the present invention that a portion of the crosslinking structural units have formed before the end of step (C), and/or that at least one of the at least two functional groups of the compounds mentioned has reacted with the hydrophilic polymer. The complete crosslinking takes place either in step (C) or in step (C) and in step (D).

It is preferable that the at least one hydrophilic polymer used as component B in the process of the invention comprises the abovementioned polymers, in particular those selected from the group consisting of starch, cellulose, polyvinyl alcohol, proteins, poly(meth)acrylamides, polysaccharides, and mixtures thereof.

The statements made in relation to the polymer blend of the invention and in relation to the process (I) are applicable to the properties and, respectively, the preferred embodiments of components B and of the aldehydes, dialdehydes, diketones, aldehyde ketones, derivatives of the abovementioned compounds, and mixtures thereof.

Step (C) of the process of the invention can be carried out at any temperature at which the components to be mixed can be mixed with one another and at which a crosslinking reaction takes place, an example being from 20 to 250° C.

The mixing and the reaction in step (C) of the process of the invention can take place in any apparatus known to the person skilled in the art, such as an extruder, or a kneader, or a stirred tank.

Step (C) of the process (II) of the invention generally mixes the following with one another: from 70 to 99.99% by weight, preferably from 90 to 99.99% by weight, particularly preferably from 95 to 99.99% by weight, of at least one hydrophilic polymer (component B) and from 0.01 to 30% by weight, preferably from 0.01 to 10% by weight, and particularly preferably from 0.01 to 5% by weight, based in each case on the mixture, of aldehyde, dialdehyde, diketone, aldehyde ketone, derivatives of the abovementioned compounds, and mixtures thereof, preferably in aqueous solution.

If appropriate, the appropriate amounts of the abovementioned additives can be added in step (C) of the process of the invention. However, this addition can also or additionally take place in step (D).

The reaction taking place in step (C) of the process (II) of the invention generally consists in the reaction of at least one of the at least two functional groups, i.e. the aldehyde groups and/or keto groups, of component D with the functional groups present in component B, in particular with the hydroxy functions present in component B, with formation of acetal groups, thus crosslinking component B.

Step (C) is carried out for a period sufficient to ensure maximum mixing of the individual components.

Step (D) of the process of the invention comprises the mixing of the modified polymer obtained in step (C) with at least one hydrophobic polymer A, in order to obtain a polymer blend.

The statements made in relation to the polymer blend of the invention and in relation to process (I), are applicable to the hydrophobic polymers (component A).

In one preferred embodiment of the process of the invention, the mixing in step (D) is carried out in an extruder. In one preferred embodiment, therefore, the mixing in step (B) and, respectively, (D) is carried out in an extruder.

The temperature in step (D) of the process of the invention is generally set in such a way that the modified polymer from step (C) and component A are mutually miscible. It is preferable that step (D) of the process of the invention is carried out at a temperature of from 80 to 220° C., particularly from 100 to 180° C., and very particularly from 120 to 170° C. In one preferred embodiment, step (B) and, respectively, (D) is therefore carried out at a temperature of from 80 to 220° C.

According to the invention, it is possible that the modified polymer from step (C) and component A are added simultaneously to the apparatus used for the mixing process, such as an extruder. However, it is preferable that component A is first melted in an extruder. The modified polymer from step (C) is then added to the molten component A.

Following step (D) of the process of the invention, any of the process steps known to the person skilled in the art for the processing and/or finishing of the resultant polymer blend can then be carried out, examples being shaping, for example drawing to give a foil or to give a film.

The polymer blend of the invention, preferably capable of production via the processes (I) and (II) of the invention, features excellent mechanical properties combined with good biodegradability and biocompatibility.

The present application therefore also provides components, foils, or films, for example in the form of packaging, carrier bags, mulch films, or trash bags, comprising a polymer blend of the invention.

The present invention also provides the use of a polymer blend of the invention for the production of components, foils, or of films.

The polymer blends of the invention obtain their advantageous properties via the use of at least one compound selected from the group consisting of formaldehyde, dialdehydes, diketones, aldehyde ketones, derivatives of the abovementioned compounds, and mixtures thereof.

The present invention therefore also provides the use of at least one compound selected from the group consisting of aldehydes, dialdehydes, diketones, aldehyde ketones, derivatives of the abovementioned compounds, and mixtures thereof for the production of polymer blends comprising at least one hydrophobic polymer, as component A, and at least one hydrophilic polymer, as component B, where component A and/or B is/are crosslinked.

The statements made above are applicable in relation to the crosslinking reagents, components A and B, and their properties, and advantageous embodiments.

EXAMPLES

Inventive Examples 1 to 4 and Comparative Example 1

Machine: MIDI 2000 extruder (twin screw) from DSM
Rotation rate: 80 rpm
Temperature: all zones: 150° C.
Additional equipment: Slot die and twin roll with motor for draw-off of foils
Starting weight: in each case 20 g Experimental Method The aromatic-aliphatic copolyester composed of terephthalic acid, adipic acid, and 1,4-butanediol (Ecoflex FBX 7011 from BASF SE) and the starch (Cerestar C Drygel 03411 from Cargill) are premixed in a beaker. The mixture is charged to the extruder, and after about 1 min. of mixing time the glyoxal or methylglyoxal is added. After a further 5 min. of mixing time, a foil is extruded.

TABLE 1

Mixing specification for inventive examples 1-3 and comparative example 1, all data being in percent by weight.

|  | CE 1 | IE 1 | IE 2 | IE 3 |
|---|---|---|---|---|
| Ecoflex FBX 7011 | 60 | 59.4 | 57 | 59.4 |
| Cerestar C | 40 | 39.6 | 38 | 39.6 |
| Glyoxal | — | 1 | 5 | — |
| Methylglyoxal | — | — | — | 1 |

TABLE 1.1

Tests to highlight the stiffness (modulus of elasticity) of the foils give the following results:

|  | CE 1 | IE 1 | IE 2 | IE 3 |
|---|---|---|---|---|
| Modulus of elasticity [MPa] | 143 | 203 | 170 | 204 |

Inventive Examples 4 to 5 and Comparative Example 2

| Machine: | ZSK30 | |
|---|---|---|
| Rotation rate: | 250 rpm | |
| Throughput: | varied | |
| Temperature profile: | Zone 0: | water cooling |
|  | Zone 1-2: | 20° C. |
|  | Zone 3: | 120° C. |
|  | Zone 4-5: | 150° C. |
|  | Zone 6-10: | 160° C. |
|  | Zone 11: | 150° C. |

Experimental Method

The aromatic-aliphatic copolyester composed of terephthalic acid, adipic acid, and 1,4-butanediol (Ecoflex FBX 7011) and a masterbatch composed of Ecoflex and 10% of erucamide (Ecoflex SL1) are used as cold feed in zone 0. The starch (Cerestar C Drygel 03411) and the crosslinking agent are metered in by way of an ancillary extruder, and excess water is removed. The extrudate is pelletized, dried, and then drawn on a chill roll to give foils.

TABLE 2

Mixing specification for inventive examples 4-5 and comparative example 2, all data being in percent by weight.

|  | CE 2 | IE 4 | IE 5 |
|---|---|---|---|
| Ecoflex FBX 7011 | 68.3 | 66.59 | 63.18 |
| Cerestar C | 30 | 29.25 | 27.75 |
| SL1 masterbatch | 1.7 | 1.66 | 1.58 |
| Glyoxal | — | 1 | 3 |

TABLE 2.1

Tests on the mechanical properties of the foils give the following results:

|  | CE 2 | IE 4 | IE 5 |
|---|---|---|---|
| Modulus of elasticity [MPa] | 80 | 165 | 138 |
| Stress at max [MPa] | 8.26 | 16.9 | 10.4 |
| Tensile strain at max [%] | 253.6 | 565.76 | 340.41 |
| Breaking stress [MPa] | 8.13 | 16.64 | 10.05 |
| Tensile strain at break [%] | 258.96 | 569.86 | 349.77 |

The invention claimed is:

1. A polymer blend, comprising
   (a) at least one hydrophobic polymer, as component A, selected from the group consisting of: polyamides, homopolyesters and/or copolyesters of aliphatic dicarboxylic acids or aromatic dicarboxylic acids with an apliphatic diol or diol mixture with 2 to 18 C-atoms, polyurethanes, polyolefins, copolymers comprising structural units composed of the abovementioned polymers, and mixtures thereof,
   (b) at least one hydrophilic polymer, as component B selected from the group consisting of: starch, cellulose, polyvinyl alcohol, proteins, poly(meth)acrylamides, polysaccharides, and mixtures thereof, and
   (c) at least one structural unit that crosslinks component A and/or B and derives from at least one compound selected from the group consisting of: dialdehydes, diketones, aldehyde ketones, derivatives of the abovementioned compounds, and mixtures thereof, as component C.

2. The polymer blend according to claim 1, wherein the at least one hydrophobic polymer (component A) is a biodegradable homopolyesters and/or copolyesters of aliphatic dicarboxylic acids or aromatic dicarboxylic acids with an aliphatic diol or diol mixture with 2 to 18 C-atoms.

3. The polymer blend according to claim 1, wherein component C derives from dialdehydes, diketones, aldehyde ketones of the general formula (I), or a mixture thereof

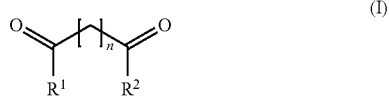

(I)

in which
R$^1$ and R$^2$, independently of one another, are hydrogen, C$_1$-C$_8$-alkyl, C2-C8-alkenyl, C$_2$-C$_8$-alkynyl, C$_6$-C$_{22}$-aryl, C$_6$-C$_{22}$-heteroaryl, C6-C22-alkylaryl, or C$_6$-C$_{22}$-alkylheteroaryl, and
n is from 0 to 12.

4. The polymer blend according to claim 1, wherein component C derives from urea derivatives or dialkylurea derivatives of dialdehydes, diketones, aldehyde ketones, or a mixture thereof, or glyoxal resins or methylglyoxal resins.

5. The polymer blend according to claim 1, which comprises at least one plasticizer.

6. A process for the production of polymer blends according to claim 1, comprising the steps of
   (A) mixing of at least one hydrophobic polymer as component A selected from the group consisting of: polyamides, homopolyesters and/or copolyesters of aliphatic dicarboxylic acids or aromatic dicarboxylic acids with an aliphatic diol or diol mixture with 2 to 18 C-atoms, polyurethanes, polyolefins, copolymers comprising structural units composed of the abovementioned polymers, and mixtures thereof with at least one hydrophilic polymer as component B selected from the group consisting of: starch, cellulose, polyvinyl alcohol, proteins, poly(meth)acrylamides, polysaccharides, and mixtures thereof, in order to obtain a polymer blend, and
   (B) mixing of the polymer blend obtained in step (A) with a compound selected from the group consisting of: dialdehydes, diketones, aldehyde ketones, derivatives of the abovementioned compounds, and mixtures thereof, as component D, and reaction in order to obtain a polymer blend.

7. A process for the production of polymer blends according to claim 1, comprising the steps of
   (C) mixing of at least one hydrophilic polymer as component B selected from the group consisting of: starch, cellulose, polyvinyl alcohol, proteins, poly(meth)acrylamides, polysaccharides, and mixtures thereof with a compound selected from the group consisting of: dialdehydes, diketones, aldehyde ketones, derivatives of the abovementioned compounds, and mixtures thereof, and reaction in order to obtain a modified polymer, and
   (D) mixing of the modified polymer obtained in step (C) with at least one hydrophobic polymer A selected from the group consisting of: polyamides, homopolyesters and/or copolyesters of aliphatic dicarboxylic acids or aromatic dicarboxylic acids with an apliphatic diol or diol mixture with 2 to 18 C-atoms, polyurethanes, polyolefins, copolymers comprising structural units composed of the abovementioned polymers, and mixtures thereof, in order to obtain a polymer blend.

8. The process according to claim 6, wherein the mixing in step (B) and, respectively, (D) is carried out in an extruder.

9. The process according to claim 6, wherein step (B) and, respectively, (D) is carried out at a temperature of from 80 to 220° C.

10. A component, a foil, or a film comprising a polymer blend according to claim 1.

11. The method of using a polymer blend according to claim 1 for the production of components, of foils, or of films.